United States Patent
Odamura (10) Patent No.: US 6,714,864 B2
(45) Date of Patent: Mar. 30, 2004

(54) METHOD AND SYSTEM FOR DISPLAYING AUTOMATICALLY SCALED MAP ACCORDING TO DEGREE OF PRECISION OF ESTIMATED MOBILE POSITION

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/156,235

(22) Filed: May 29, 2002

(65) Prior Publication Data

US 2002/0183927 A1 Dec. 5, 2002

(30) Foreign Application Priority Data

May 29, 2001 (JP) ........................................ 2001-159922

(51) Int. Cl.$^7$ ............................. G01C 21/00; G01S 3/02
(52) U.S. Cl. ................... 701/212; 701/213; 342/357.06
(58) Field of Search ................................. 701/211, 212, 701/213, 214, 215; 342/357.06, 357.09, 357.15; 340/995.15, 995.17, 995.12

(56) References Cited

U.S. PATENT DOCUMENTS

| | | | | |
|---|---|---|---|---|
| 5,084,822 A | * | 1/1992 | Hayami | ....................... 701/212 |
| 5,732,385 A | * | 3/1998 | Nakayama et al. | ......... 701/201 |
| 5,913,170 A | * | 6/1999 | Wortham | ..................... 455/457 |
| 6,070,078 A | * | 5/2000 | Camp, Jr. et al. | ......... 455/456.2 |
| 6,148,261 A | * | 11/2000 | Obradovich et al. | ........ 701/208 |
| 6,278,402 B1 | * | 8/2001 | Pippin | .................... 342/357.08 |
| 6,329,945 B1 | | 12/2001 | Hynes | |
| 6,334,090 B1 | * | 12/2001 | Fujii | .......................... 701/213 |
| 6,401,035 B2 | * | 6/2002 | Jin | .............................. 701/213 |
| 6,567,744 B1 | * | 5/2003 | Katayama et al. | ........... 701/209 |
| 2002/0003495 A1 | | 1/2002 | Johnstone et al. | |

FOREIGN PATENT DOCUMENTS

| | | | |
|---|---|---|---|
| GB | 2 356 097 A | | 5/2001 |
| JP | 62-142214 | * | 6/1987 |
| JP | 01-161111 | * | 6/1989 |
| JP | 6265364 A | | 9/1994 |
| JP | 11295101 A | | 10/1999 |
| JP | 2000266552 A | | 9/2000 |

* cited by examiner

Primary Examiner—Michael J. Zanelli
(74) Attorney, Agent, or Firm—Foley & Lardner

(57) ABSTRACT

The global position of a mobile terminal is estimated from GPS (global positioning system) signals transmitted from a number of GPS satellites and received by the mobile terminal. The degree of precision of the estimated global position is determined and the size, or scale of an area to be displayed is determined according to the degree of precision, and a map of the area of the determined size is generated according to the global position of the mobile terminal, and displayed on the mobile terminal.

13 Claims, 8 Drawing Sheets

METHOD AND SYSTEM FOR DISPLAYING AUTOMATICALLY SCALED MAP ACCORDING TO DEGREE OF PRECISION OF ESTIMATED MOBILE POSITION

BACKGROUND OF THE INVENTION

1. Field of the Invention

The present invention relates generally to global positioning systems, and more specifically to a method and system for displaying maps for personal navigational aid.

2. Description of the Related Art

The global positioning system, or GPS, has recently been used extensively for application to wireless mobile terminals to serve as a personal navigational aid. According to the current method, the mobile terminal receives signals from GPS satellites, determines its global position by processing the received signals, and transmits a request via a mobile communications network to a map server for a map. The request contains information about the mobile's global position and the scale of the map that is being requested (i.e. the size of the geographical area to be displayed). In response, the map server produces a map of the requested scale and communicates the map to the mobile terminal for display. However, due to the presence of hindrances in the paths of signals from line-of-sight GPS satellites, the received signals may be disrupted or may lose critical data, particularly when the user is moving around built-up areas. As a result, the user may not be satisfied with the displayed map and may transmit another request to the map server to alter the scale of the map. The process will be repeated until the displayed map meets the user's satisfaction. However, this is tedious and time-consuming.

Therefore, there exists a need for eliminating the manual process of determining the scale of a map displayed on a wireless mobile terminal.

SUMMARY OF THE INVENTION

It is therefore an object of the present invention to provide a method and system for automatically displaying a map of appropriate scale on a mobile terminal.

The stated object is obtained by determining a degree of precision of estimated mobile position and determining the scale of a map according to the determined degree of precision.

According to a first aspect of the present invention, there is provided a method of displaying a map on a mobile terminal, comprising the steps of estimating a global position of the mobile terminal from signals transmitted from a plurality of GPS (global positioning system) satellites and received by the mobile terminal, determining a degree of precision of the estimated global position of the mobile terminal, determining a size of an area to be displayed according to the degree of precision, generating a map of the area of the determined size according to the global position of the mobile terminal, and displaying the map on the mobile terminal.

According to a second aspect, the present invention provides a mobile communication system comprising a communications network, a server connected to the network for estimating a global position from received GPS signals, and a mobile terminal for receiving GPS signals from GPS satellites and transmitting the received GPS signals to the server station via the communications network to cause the server station to determine the global position of the mobile terminal. The server determines a degree of precision of the estimated global position of the mobile terminal and determines the size of an area to be displayed on the mobile terminal according to the degree of precision, generates a map of the area of the determined size according to the global position of the mobile terminal and communicates the generated map to the mobile terminal.

According to a third aspect, the present invention provides a mobile communication system comprising a communications network, a mobile terminal for receiving GPS signals from GPS satellites, and a server. The mobile terminal estimates its global position from the received GPS signals, determines a degree of precision of the estimated global position of the mobile termial and determines the size of an area to be displayed on the mobile terminal according to the degree of precision. From the mobile terminal a server receives information as to the global position of the mobile terminal and the size of the map via the network, generates a map of the area of the size according to the received information and communicates the map to the mobile terminal via the network.

BRIEF DESCRIPTION OF THE DRAWIGNS

The present invention will be described in detail further with reference to the following drawings, in which.

DETAILED DESCRIPTION

Figure 1:
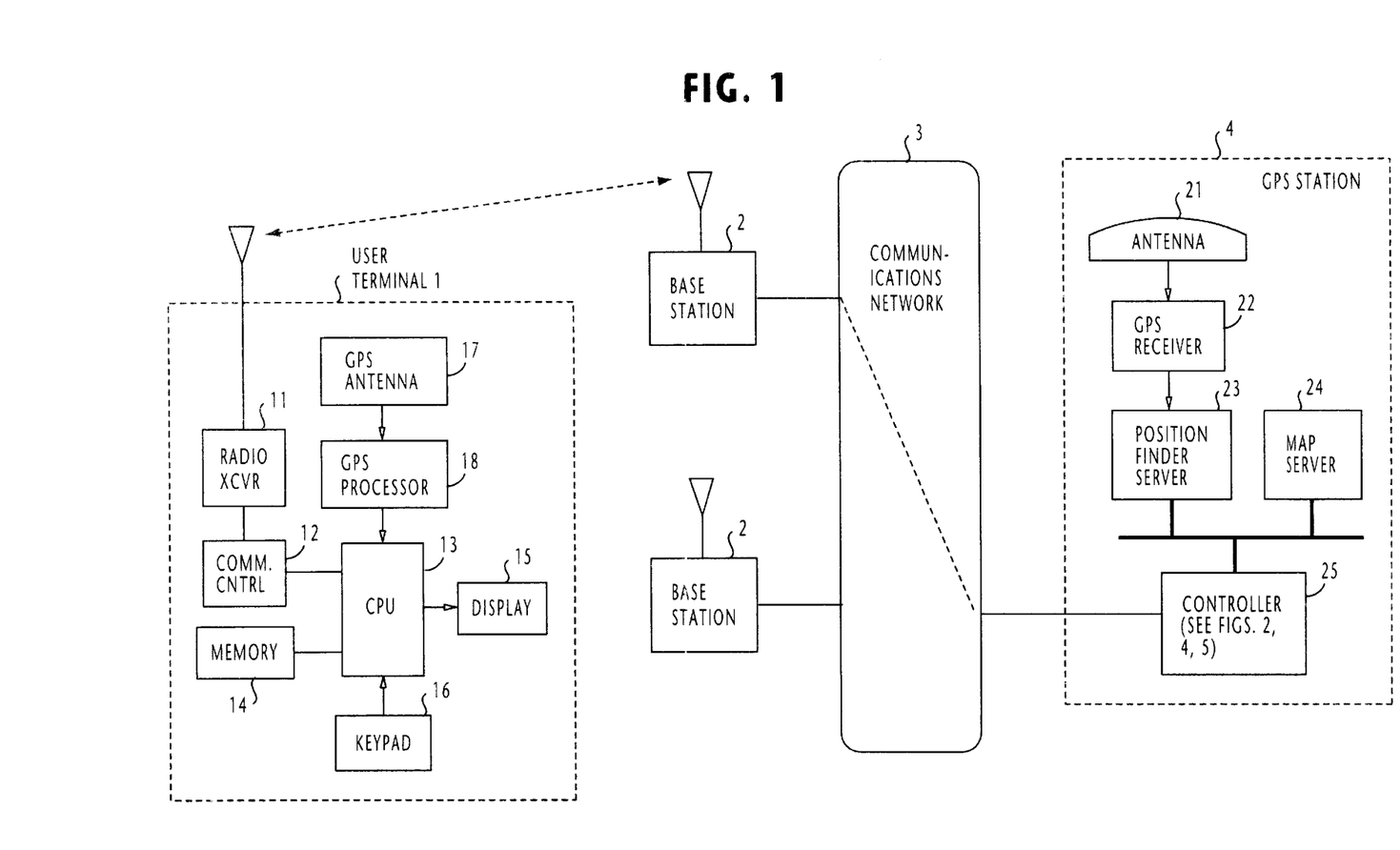
FIG. 1 is a block diagram of a communication system according to a first embodiment of the present invention.

In FIG. 1, there is shown a communication system according to a first embodiment of the present invention. The communication system is comprised of a communications network 3 to which a plurality of wireless base stations 2 and a GPS (global positioning system) station 4 are connected.

A user mobile terminal 1 operates with a radio transceiver 11 to set up a wireless link to a nearby base station. A communication controller 12 performs communication control of the terminal 1 with the base station according to the known protocol. A central processing unit (CPU) receives signals from the controller 12 and saves the signals in a memory 14 to display a map on a display panel 15. User instructions are entered through a keypad 16 to the CPU 13. A GPS antenna 17 is provided to receive signals from GPS satellites and a GPS processor 18 processes the received GPS signals. The processed signals are supplied to the CPU. In a first embodiment of the present invention, the CPU produces a precision GPS signal from the signals directly received from the satellites and supplemental GPS data obtained from the GPS station 4.

GPS station 4 is comprised of a GPS antenna 21, a GPS receiver 22, a position finder server 23 and a map server 24. Both servers 23 and 24 are connected by a bus system to a server controller 25, which is in turn connected to the communications network 3 to exchange signals with the mobile terminal 1 via one of the base stations 2. The GPS receiver 22 processes signals detected by the GPS antenna 21 and produces the supplemental GPS data by using the signals supplied from the GPS antenna 21 and the signals received from the mobile terminal 1.

The operation of the server controller 25 according to the first embodiment will be explained below with reference to the flowchart of FIG. 2.

Initially, the mobile terminal sends a request to the server controller 25 for supplemental data. In response to the request from the mobile terminal 1 (step 201), the server controller 25 establishes a link between the mobile terminal and the position finder server 23 and retrieves supplemental data from the server 23, indicating the identification numbers of line-of-sight GPS satellites, and transmits it to the mobile terminal (step 202). On the other hand, the mobile terminal 1 is receiving GPS signals from the line-of-sight GPS satellites. Using the supplemental data from the server controller and the received GPS signals, the mobile terminal 1 calculates a pseudorange and transmits it as a precision GPS signal to the GPS station 4 via the communications network 3.

When the server controller 25 receives the precision GPS signal from the mobile terminal 1 (step 203), it instructs the position finder server 23 to determine the global position of the mobile terminal by using the precision GPS signal (step 204). Further, the server controller uses the precision GPS signal to determine the constellatory positions of line-of-sight GPS satellites from which the mobile terminal has actually received the GPS signals and performs map scaling subroutine 200.

In the map scaling subroutine, the server controller uses the position data of the satellites and analyzes it to determine the constellatory positions of the satellites. According to their constellatory positions, the server controller divides the satellites into a group of four sectors, or quadrants in the constellation and determines the number of quadrants in which the line-of-sight GPS satellites are currently located as a measure of the degree of precision of estimated position of the mobile terminal.

Figure 3A:
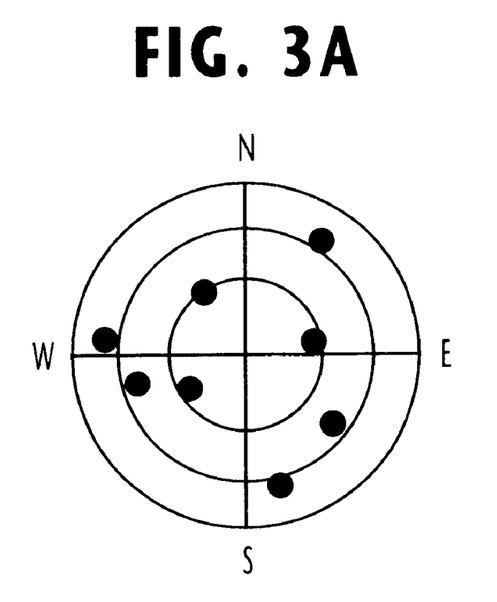
FIGS. 3A and 3B are exemplary illustrations of constellatory positions of line-of-sight GPS satellites.
Figure 3B:
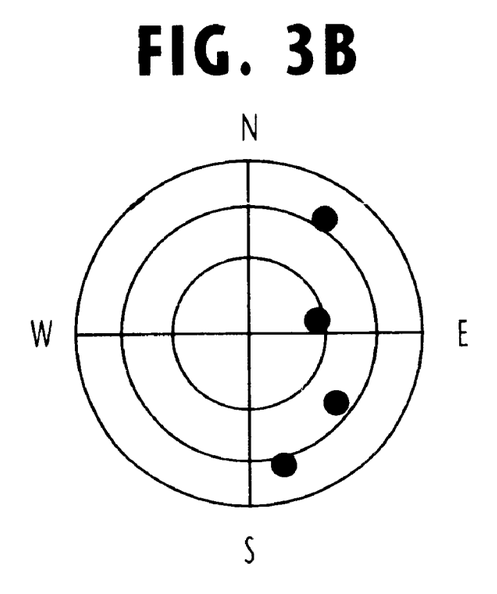

FIG. 3A shows one example of constellatory positions of line-of-sight GPS satellite where the solid dots represent GPS satellites. In the illustrated example, the satellites are distributed relatively equally among the four quadrants of the constellation, and hence the number of quadrants where the line-of-sight satellites exist is four. Note that the center of the circles corresponds to the position where the mobile user terminal is located. In FIG. 3B, the line-of-sight GPS satellites are shown unequally distributed possibly due to hindrance by terrain or building structures so that only two satellites are in line of sight in each of the first (north-east) and fourth (south-east) quadrants to the mobile terminal and no satellites are in line of sight in the second and third quadrants. In the case of FIG. 3B, the number of quadrants containing line-of-sight GPS satellites is two.

Returning to FIG. 2, the map scaling subroutine 200 begins with decision step 205 to make a decision as to whether the line-of-sight GPS satellites exist in all the four quadrants. If this is the case, flow branches out to step 206 to select a 50-meter×50-meter square area and proceeds to the end of the subroutine, If the decision at step 205 is negative, flow proceeds to step 207 to determine if the line-of-sight satellites only exist in three quadrants. If so, a 100-meter×100-meter square area is selected (step 208). If the decision at step 207 is negative, flow proceeds to step 209 to determine if the line-of-sight satellites only exist in two quadrants. If so, a 200-meter×200-meter square area is selected (step 210). If the decision at step 209 is negative, a 500-meter×500-meter square area is selected (step 211).

When the execution of subroutine 200 ends, flow proceeds to step 212 in which the server controller informs the map server 24 of the current position of the mobile terminal (as determined at step 204) and instructs it to send map data of the selected area to the user terminal. On receiving the map data, the user terminal displays a map on its display panel.

In a modified embodiment of the present invention, instead of the constellatory positions of line-of-sight GPS satellites, the signal-to-noise ratio (SNR) of the COPS signal and the number of GPS satellites transmitting signals of relatively high SNR are used to make decisions as to the scale of the map.

Figure 4:
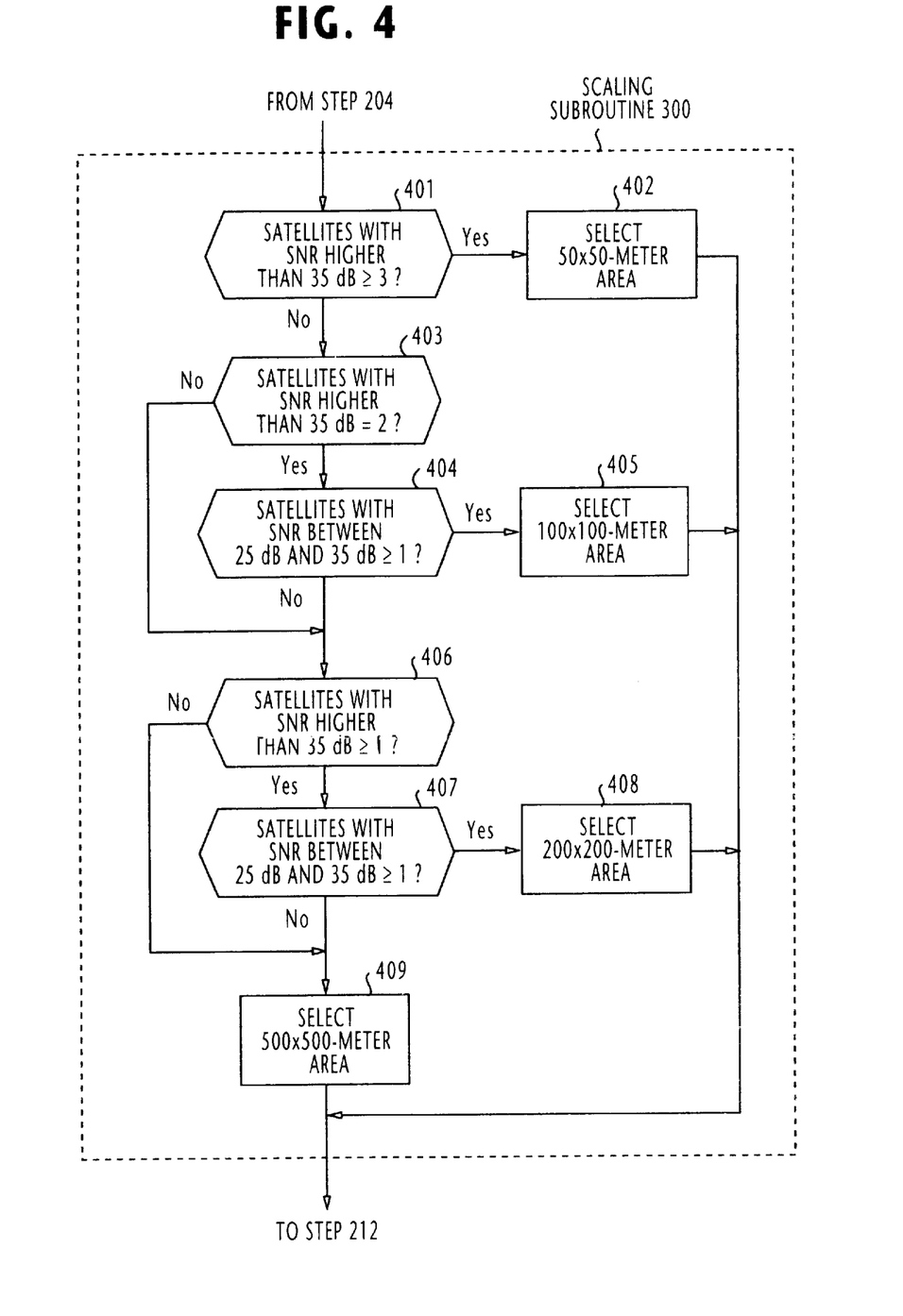
FIG. 4 is a flowchart of a modified form of the map scaling subroutine of FIG. 2.

The modified map scaling subroutine 300 is shown in FIG. 4.

In FIG. 4, the subroutine 300 begins with step 401 which determines whether there are three or more satellites which are transmitting GPS signals with SNR higher than 35 dB. If the decision is affirmative, flow proceeds to step 402 to select a 50-meter×50-meter square area. If the decision is negative at step 401, flow proceeds to step 403 to determine whether there are only two satellites whose SNR value is greater than 35 dB. If so, flow proceeds from step 403 to step 404 to determine whether there is at least one satellite whose SNR value is in the range between 25 dB and 35 dB. If this is the case, flow proceeds from step 404 to step 405 to select a 100-meter×100-meter square area. If the decision at step 403 or step 404 is negative, flow proceeds to step 406 to determine whether there is at least one satellite whose SNR value is greater than 35 dB. If so, flow proceeds to step 407 to make a further decision as to whether there is at least one satellite whose SNR ratio is in the range between 25 dB and 35 dB. If this is the case, flow proceeds from step 407 to step 408 to select a 200-meter×200-meter square area. If the decision at step 406 or step 407 is negative, flow proceeds to step 409 to select a 500-meter×500-meter square area.

Figure 5:
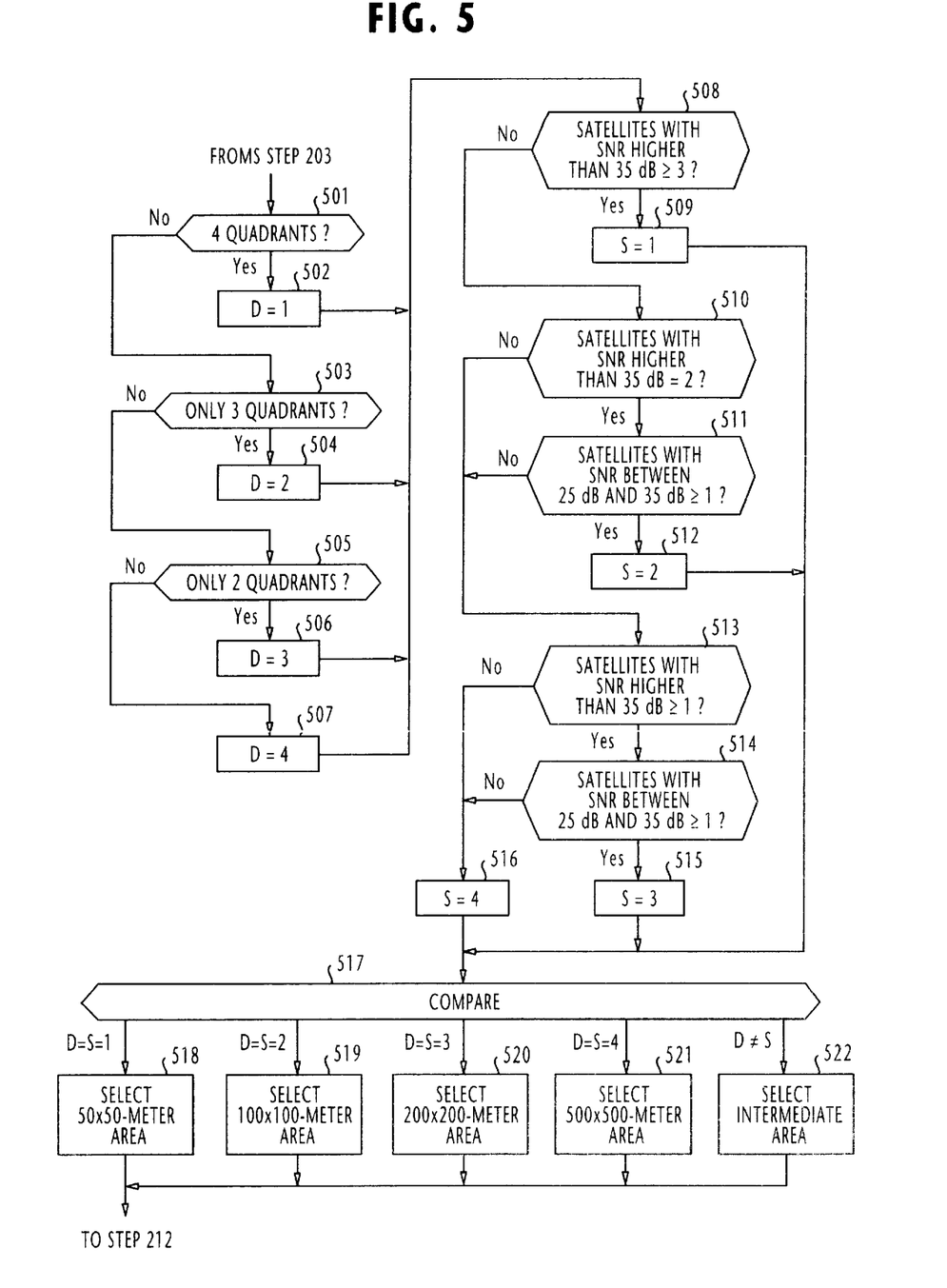
FIG. 5 is a flowchart of a further modification of the map scaling subroutine of FIG. 2.

FIG. 5 shows a further modification of the map scaling subroutine, which begins with step 501 which determines whether the line-of-sight GPS satellites exist in all four quadrants of the constellation. If so, flow proceeds to step 502 to set a variable D to 1, and if not, flow branches out to step 503 to determine if the line-of-sight satellites exist only in three quadrants. If so, flow proceeds to step 504 to set the variable D to 2, and if not, flow proceeds to step 505 to determine if there are only two quadrants in which the line-of-sight satellites exist, If so, flow proceeds to step 506 to set the variable D to 3. Otherwise, flow proceeds to step 507 to set the variable D to 4.

Following the execution of each of steps 502, 504, 506, 507, flow proceeds to step 508 to determine if there are at least three satellites whose SNR value is higher than 35 dB, if so, a variable S is set to 1 at step 509. Otherwise, flow proceeds from step 508 to step 510 determine if there are two satellites whose SNR value is higher than 35 dB. If so, a further decision is made at step 511 as to whether there is at least one satellite whose SNR value is in the range between 25 dB and 35 dB. If so, flow proceeds to step 512 to set the variable S to 2. If the decision at step 510 or 511 is negative, a further decision is made at step 513 as to whether there is at least one satellite whose SNR value is higher than 35 dB, and if so, flow proceeds to step 514 to S determine if there is at least one satellite whose SNR value is in the range between 25 dB and 35 dB. If the decision is affirmative at step 514, the variable S is set to 3 at step 515. If the decision at step 513 or 514 is negative, the variable S is set equal to 4 at step 516. Following the execution of each of steps 509, 512, 515 and 516, flow proceeds to decision step 517 to compare the variables D and S with one another.

If D=S=1, 50-meter×50-meter square area is selected (step 518). If D=S=2, 100-meter×100-meter square area is selected (step 519). If D=S 3, 200-meter×200-meter square area is selected (step 520). If D=S=4, 400-meter×400-meter square area is selected (step 521). If D is not equal to S, an intermediate area is selected depending on their relative values (step 522). If D=1 and S=2, for example, an area of 75-meter by 75-meter square is selected.

In the embodiments described above, the map scaling subroutine is performed by the GPS station 4. The map scaling subroutine can be performed by the user's mobile terminal 1 in a communications system shown in FIG. 6.

Figure 6:
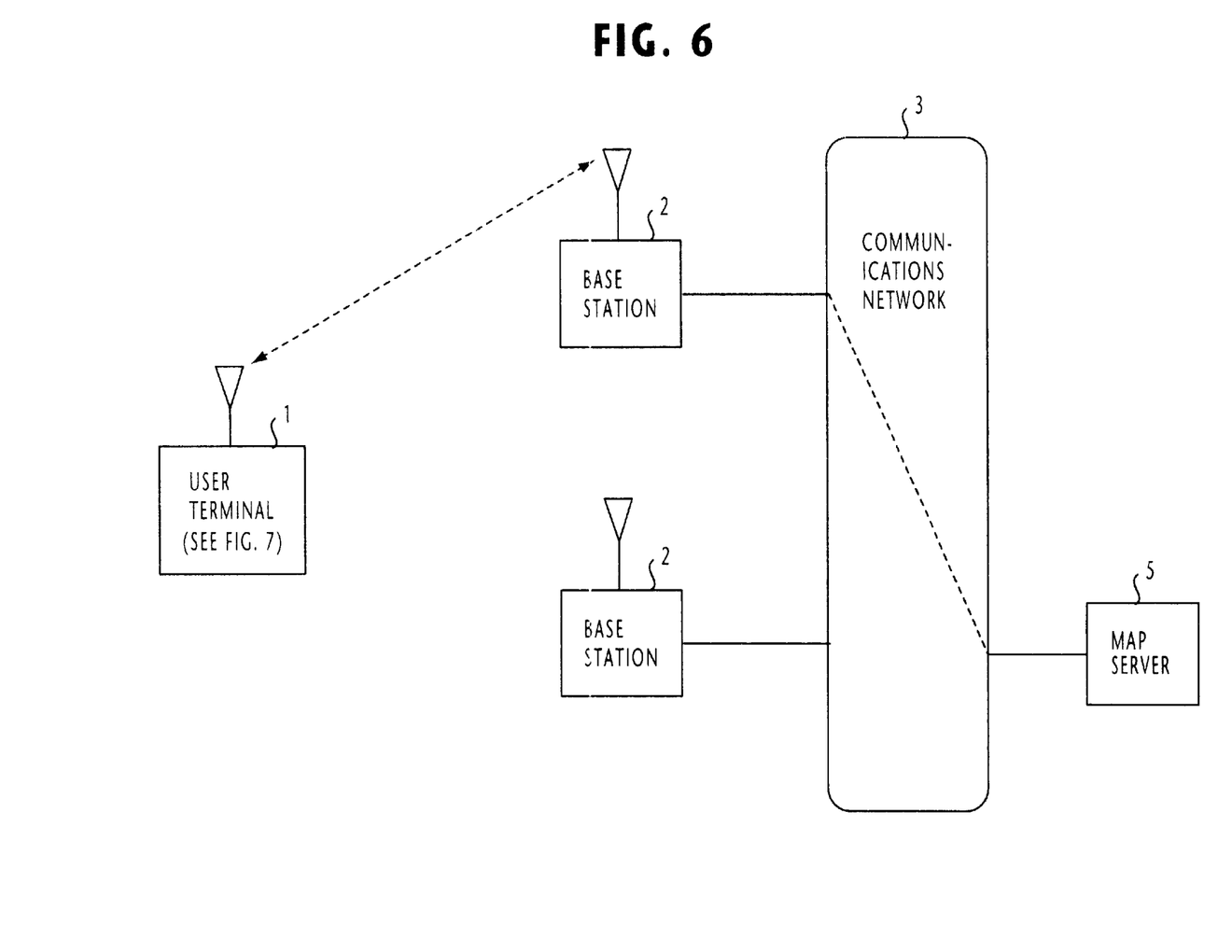
FIG. 6 is a block diagram of a communication system according to a second embodiment of the present invention.
Figure 7:
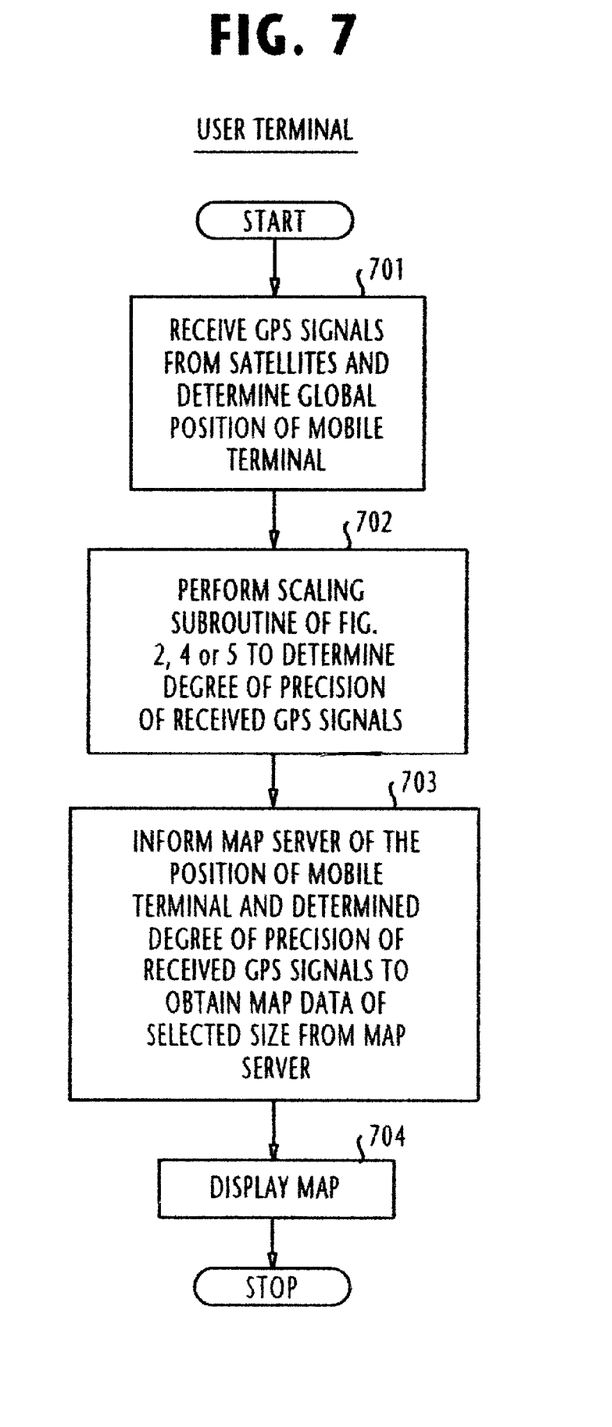
FIG. 7 is a flowchart of the operation of the mobile terminal of FIG. 6.

In FIG. 6, the mobile terminal 1 establishes a wireless link with one of the base stations 2 and establishes a connection to the map server 5 via the communications network 3. The operation of the mobile terminal 1 proceeds according to the flowchart of FIG. 7, in which the routine begins with step 701 to receive GPS signals and process the received signals to produce a precision GPS signal and estimate the global position of the mobile terminal using the precision GPS signal. At step 702, the mobile terminal performs the map scaling subroutine of either FIG. 2, 4 or 5 to determine the degree of precision of the estimated global position of the mobile terminal and select an area size. At step 703, the mobile terminal sends a request indicating the global position of the mobile terminal and the selected area size to the map server 5. Map server 5 generates a map of a geographic area according to the informed global position and scales the map according to the selected area size and transmits visual information containing the generated map to the mobile terminal 1. Mobile terminal 1 thus obtains a map of the area at the selected scale where the mobile terminal is in. At step 704, the obtained map is then displayed on the mobile terminal.

Figure 8:
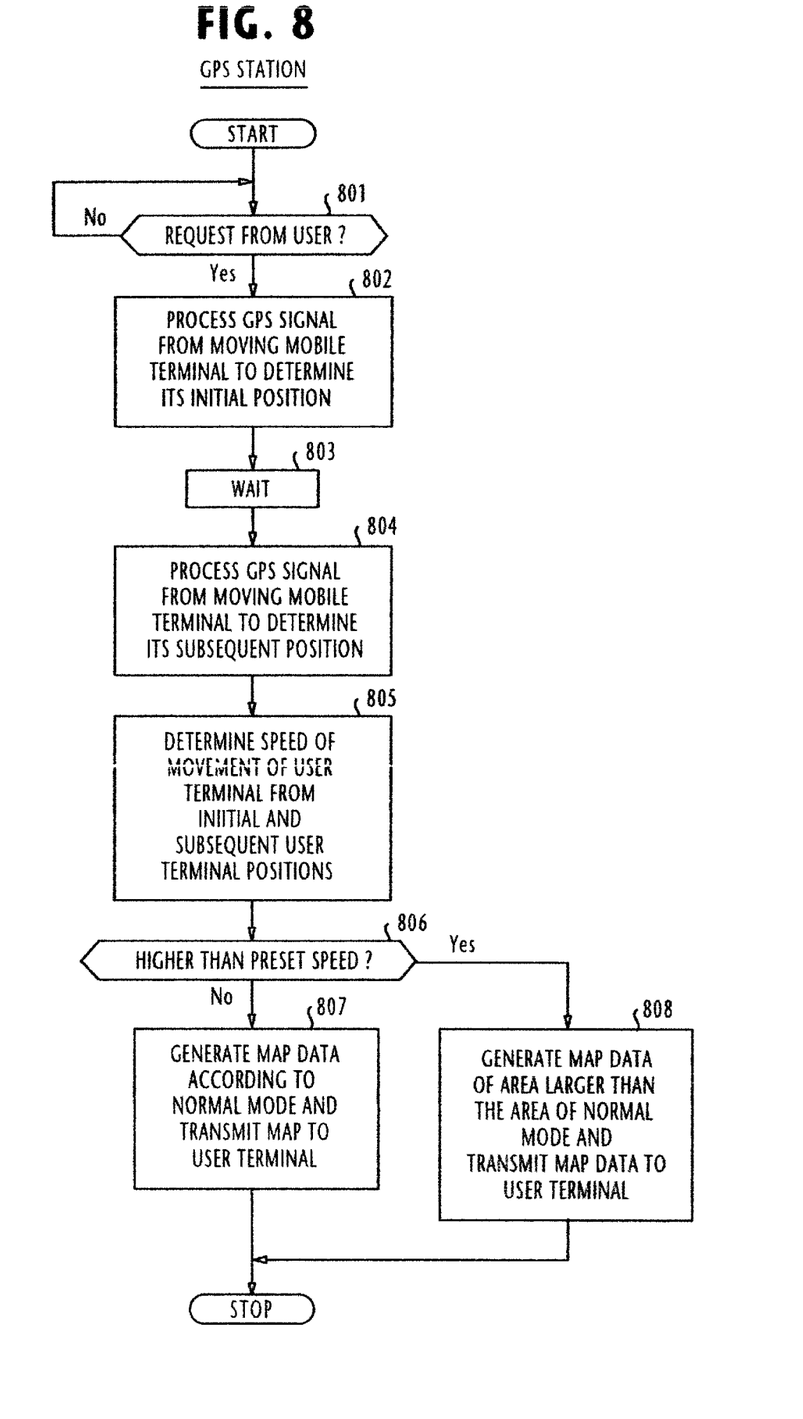
FIG. 8 is a flowchart of the operation of a server of FIG. 1 when the mobile terminal is in a moving vehicle.

FIG. 8 illustrates a flowchart of the operation of the server controller of FIG. 1 according to another embodiment of the present invention. This embodiment is particularly useful for applications where the user is driving an automobile.

Mobile terminal 1 is located in a moving vehicle. The terminal initially receives signals from the GPS satellites and processes the signals to produce precision GPS signal without supplemental data from the network and transmits a request to the network containing the precision GPS signal for a map of the area where the vehicle is moving around.

In response to the request from the mobile terminal (step 801), the GPS station 5 processes the precision GPS signal contained in the request and determines the initial position of the moving vehicle (step 802). Then, the routine proceeds to step 803 to wait a predetermined amount of time. At step 804, the GPS station obtains the most recent precision GPS signal from the mobile terminal and determines its subsequent vehicle position. At step 805, the initial and subsequent positions of the mobile terminal are used to calculate its speed of the vehicle. The calculated speed is then compared, at step 806, with a preset value. If the calculated speed is lower than the preset value, map data of normal scale is generated according to the normal mode of operation and the map data is transmitted to the mobile terminal (step 807). If the calculated speed is higher than the preset value, a map of wide area is generated according to the detected positions of the vehicle and the information of the map is transmitted to the mobile terminal for display (step 808).

Figure 2:
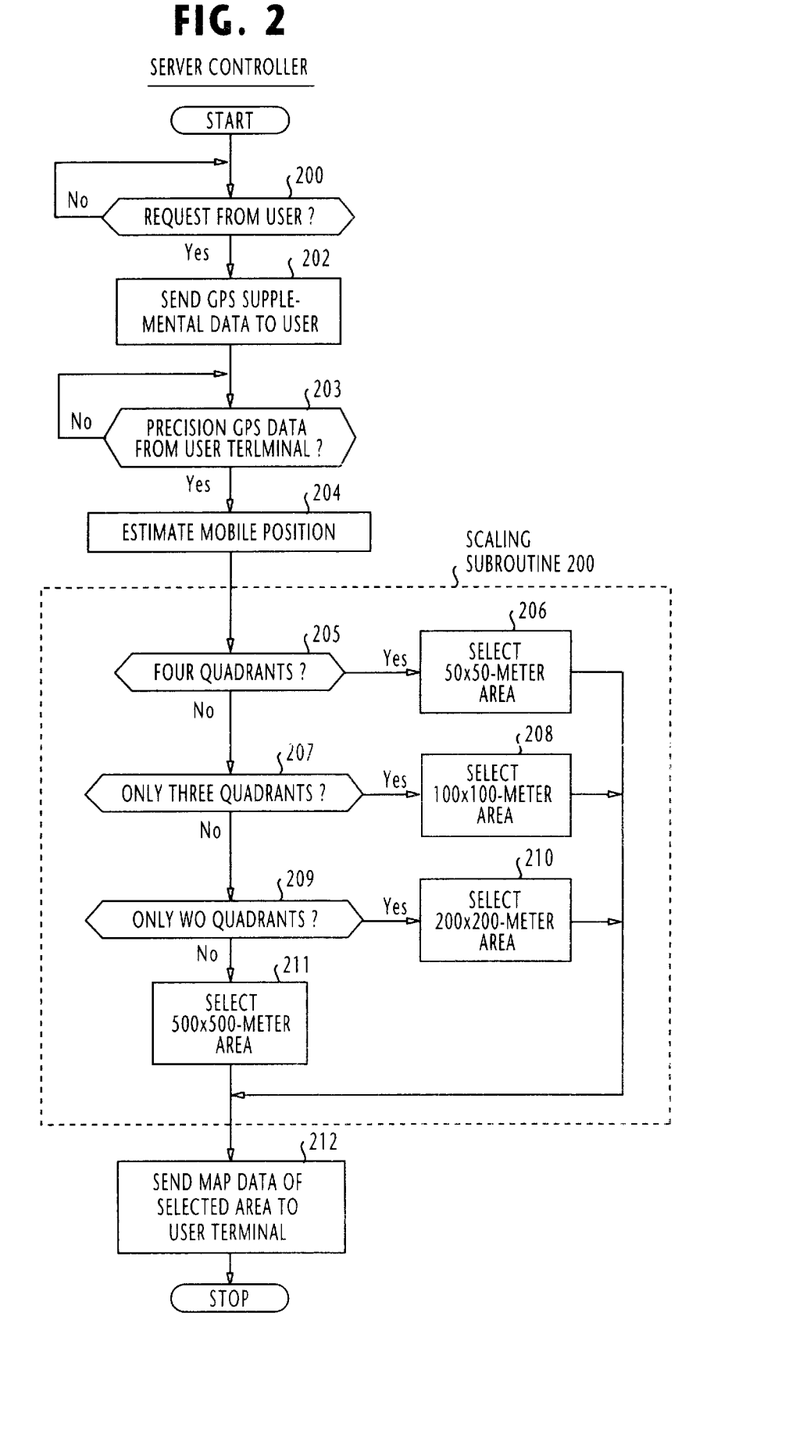
FIG. 2 is a flowchart of the operation of a server controller in the GPS station of FIG. 1 according to the first embodiment of the present invention.

While the embodiments of FIGS. 2 and 8 are based on the known network driven system and the standalone system, respectively, the present invention could equally be as well implemented using the known network assist system in which the global position of the mobile terminal is estimated by the mobile terminal after receiving GPS signals from a GPS server.

What is claimed is:

1. A method of displaying a map on a mobile terminal, comprising the steps of:
   a) estimating a global position of said mobile terminal from signals transmitted from a plurality of GPS (global positioning system) satellites and received by said mobile terminal;
   b) determining a number of said plurality of GPS satellites whose transmissions are higher than a predetermined signal-to-noise ratio;
   c) determining a size of an area to be displayed based on said determined number of GPS satellites;
   d) generating a map of said area of said determined size according to said global position of said mobile terminal; and
   e) displaying said map on said mobile terminal.

2. The method of claim 1, wherein step (a) comprises the steps of:
   receiving, at said mobile terminal, the signals transmitted from said GPS satellites;
   receiving, at a GPS system, the signals transmitted from said GPS satellites, producing therefrom supplemental GPS data and transmitting the supplemental GPS data to the mobile terminal;
   producing, at said mobile terminal, a precision GPS signal by using the signals of the GPS satellites received at the mobile terminal and said supplemental GPS data from said GPS system; and
   determining, at said GPS system, said global position of the mobile terminal from said precision GPS signal.

3. The method of claim 2, wherein the step of generating a map of said area of said determined size according to said global position of said mobile terminal comprises the steps of:
   successively receiving, at said GPS system, a plurality of precision GPS signals from said mobile terminal during a predetermined time interval and determining therefrom initial and subsequent global positions of said mobile terminal;
   determining a moving speed of said mobile terminal from said initial and subsequent global positions of the mobile terminal; and
   generating, according to said global positions, a map of an area of said determined size when the determined moving speed is lower than a predetermined value and a map of an area larger than said determined size when the determined moving speed is higher than said predetermined value.

4. The method of claim 1, wherein step (a) comprises the steps of:
   receiving, at said mobile terminal, signals from said plurality of GPS satellites and producing therefrom a precision GPS signal; and determining, at said mobile terminal, a global position of the mobile terminal.

5. A method of displaying a map on a mobile terminal, comprising the steps of:

estimating a global position of said mobile terminal from signals transmitted from a plurality of GPS (global positioning system) satellites and received by said mobile terminal;

determining constellatory positions of line-of-sight GPS satellites and determining from said constellatory positions a number of equally divided areas of constellation in which said line-of-sight GPS satellites exist;

determining a degree of precision of the estimated global position from the determined number of said divided areas;

determining a size of an area to be displayed according to said degree of precision;

generating a map of said area of said determined size according to said global position of said mobile terminal; and displaying said map on said mobile terminal.

6. A method of displaying a map on a mobile terminal, comprising the steps of:

estimating a global position of said mobile terminal from signals transmitted from a plurality of GPS (global positioning system) satellites and received by said mobile terminal;

determining constellatory positions of line-of-sight GPS satellites and determining from said constellatory positions a number of equally divided areas of constellation in which said line-of-sight GPS satellites exist;

determining a number of GPS satellites whose transmissions are higher than a predetermined signal-to-noise ratio;

determining a degree of precision of the estimated global position from a combination of the determined number of said divided areas and the determined number of said GPS satellites;

determining a size of an area to be displayed according to said degree of precision;

generating a map of said area of said determined size according to said global position of said mobile terminal; and displaying said map on said mobile terminal.

7. A mobile communication system comprising:

a communications network;

a server connected to the network for determining a global position from received GPS (global positioning system) signals; and a mobile terminal for receiving GPS signals from GPS satellites and transmitting the received GPS signals to said server via said communications network to thereby cause said server to estimate the global position of the mobile terminal, said server determining a degree of precision of the estimated global position of said mobile terminal and determining the size of an area to be displayed on said mobile terminal according to said degree of precision, generating a map of said area of said determined size according to said global position of said mobile terminal and communicating the generated map to said mobile terminal;

wherein said server determines a number of GPS satellites whose transmissions are higher than a predetermined signal-to-noise ratio, and determines said degree of precision of the estimated global position from the determined number of GPS satellites.

8. The mobile communication system of claim 7, wherein said server successively receives a plurality of said GPS signals from said mobile terminal during a predetermined time interval and determines therefrom initial and subsequent global positions of said mobile terminal, determines a moving speed of said mobile terminal from said initial and subsequent global positions of the mobile terminal, and generates, according to said global positions, a map of an area of said determined size when the determined moving speed is lower than a predetermined value and a map of an area larger than said determined size when the determined moving speed is higher than said predetermined value.

9. A mobile communication system comprising:

a communications network;

a server connected to the network for determining a global position from received GPS (global positioning system) signals; and a mobile terminal for receiving GPS signals from GPS satellites and transmitting the received GPS signals to said server via said communications network to thereby cause said server to estimate the global position of the mobile terminal, said server determining a degree of precision of the estimated global position of said mobile terminal and determining the size of an area to be displayed on said mobile terminal according to said degree of precision, generating a map of said area of said determined size according to said global position of said mobile terminal and communicating the generated map to said mobile terminal;

wherein said server determines constellatory positions of line-of-sight GPS satellites and determines from said constellatory positions a number of equally divided areas of constellation in which said line-of-sight GPS satellites exist, and determines said degree of precision of the estimated global position from the determined number of said divided areas.

10. A mobile communication system comprising:

a communications network;

a server connected to the network for determining a global position from received GPS (global positioning system) signals; and a mobile terminal for receiving GPS signals from GPS satellites and transmitting the received GPS signals to said server via said communications network to thereby cause said server to estimate the global position of the mobile terminal, said server determining a degree of precision of the estimated global position of said mobile terminal and determining the size of an area to be displayed on said mobile terminal according to said degree of precision, generating a map of said area of said determined size according to said global position of said mobile terminal and communicating the generated map to said mobile terminal;

wherein said server determines constellatory positions of line-of-sight GPS satellites, determines from said constellatory positions a number of equally divided areas of constellation in which said line-of-sight GPS satellites exist, determines a number of GPS satellites whose transmissions are higher than a predetermined signal-to-noise ratio, and determines said degree of precision of the estimated global position from a combination of the determined number of said divided areas and the determined number of said GPS satellites.

11. A mobile communication system comprising:

a communications network;

a mobile terminal for receiving GPS (global positioning system) signals from GPS satellites, estimating a global position of the mobile terminal from the received GPS signals, determining a degree of precision of the estimated global position and determining the size of an area to be displayed on said mobile terminal according to said degree of precision; and a server for receiving from said mobile terminal information of said global position and said size via said network, generating a map of said area of said determined size according to the received information and communicating the map to said mobile terminal via said network;

wherein said mobile terminal determines a number of GPS satellites whose transmissions are higher than a predetermined signal-to-noise ratio, and determines said degree of precision of the estimated global position from the determined number of GPS satellites.

12. A mobile communication system comprising:

a communications network;

a mobile terminal for receiving GPS (global positioning system) signals from GPS satellites, estimating a global position of the mobile terminal from the received GPS signals, determining a degree of precision of the estimated global position and determining the size of an area to be displayed on said mobile terminal according to said degree of precision; and a server for receiving from said mobile terminal information of said global position and said size via said network, generating a map of said area of said determined size according to the received information and communicating the map to said mobile terminal via said network;

wherein said mobile terminal determines constellatory positions of line-of-sight GPS satellites and determines from said constellatory positions a number of equally divided areas of constellation in which said line-of-sight GPS satellites exist, and determines said degree of precision of the estimated global position from the determined number of said divided areas.

13. A mobile communication system comprising:

a communications network;

a mobile terminal for receiving GPS (global positioning system) signals from GPS satellites, estimating a global position of the mobile terminal from the received signals, determining a degree of precision of the estimated global position and determining the size of an area to be displayed on said mobile a degree of precision; and a server for receiving from said mobile terminal information of said global position and said size via said network, generating a map of said area of said determined size according to the received information and communicating the map to said mobile terminal via said network;

wherein said mobile terminal determines constellatory positions of line-of-sight GPS satellites, determines from said constellatory positions a number of equally divided areas of constellation in which said line-of-sight GPS satellites exist, determines a number of GPS satellites whose transmissions are higher than a predetermined signal-to-noise ratio, and determines said degree of precision of the estimated global position from a combination of the determined number of said divided areas and the determined number of said GPS satellites.

* * * * *